United States Patent
Maier et al.

(10) Patent No.: US 7,096,682 B2
(45) Date of Patent: Aug. 29, 2006

(54) REFRIGERATION DEVICE AND OPERATING METHOD FOR A REFRIGERATION DEVICE

(75) Inventors: Roland Maier, Neresheim (DE); Wolfgang Becker, Blaustein (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/774,984

(22) Filed: Feb. 9, 2004

(65) Prior Publication Data

US 2005/0028541 A1    Feb. 10, 2005

Related U.S. Application Data

(63) Continuation of application No. PCT/EP02/08958, filed on Aug. 9, 2002.

(30) Foreign Application Priority Data

Aug. 14, 2001    (DE)    ................... 101 39 834

(51) Int. Cl.
F25D 17/06    (2006.01)
F25D 11/02    (2006.01)
F25B 5/00    (2006.01)

(52) U.S. Cl. ................... 62/180; 62/182; 62/186; 62/229

(58) Field of Classification Search .................. 62/180, 62/179, 182, 186, 229, 228.1, 208, 209, 203
See application file for complete search history.

(56) References Cited

U.S. PATENT DOCUMENTS

| | | | | |
|---|---|---|---|---|
| 5,678,416 A | | 10/1997 | Yoo et al. | |
| 5,720,180 A | * | 2/1998 | Suh ............................ | 62/180 |
| 5,771,701 A | * | 6/1998 | Suh ............................ | 62/179 |
| 5,931,004 A | * | 8/1999 | Yoo et al. .................... | 62/180 |
| 6,286,326 B1 | | 9/2001 | Kopko | |
| 6,327,867 B1 | | 12/2001 | Hyodo et al. | |

FOREIGN PATENT DOCUMENTS

DE    3904216 A1    8/1990
DE    19815642 A1    10/1999

* cited by examiner

*Primary Examiner*—Harry B. Tanner
(74) *Attorney, Agent, or Firm*—John T. Winburn; Russell W. Warnock; Craig J. Loest

(57) ABSTRACT

A refrigeration device and method of operation, including at least two separate temperature zones, each having a set temperature range. Both zones are cooled by a separate evaporator with both of the evaporators arranged in a common coolant circuit having operational and non-operational phases. At least one temperature zone includes a fan and the temperature is measured in at least a first one of the temperature zones. The fan is operated intermittently in the operational and non-operational phases depending on a preset temperature measured in the first temperature zone. The operational and non-operational phases of the fan and the coolant circuit are operated such that the operational phases of the coolant circuit coincide at least partially with the non-operational phases of the fan.

9 Claims, 3 Drawing Sheets

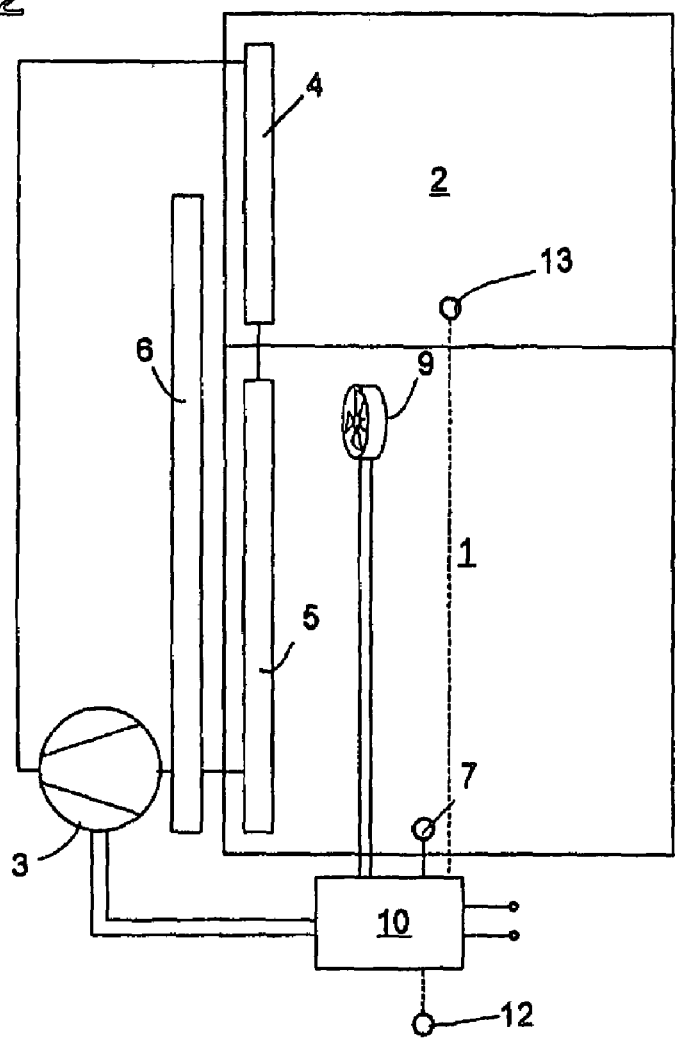
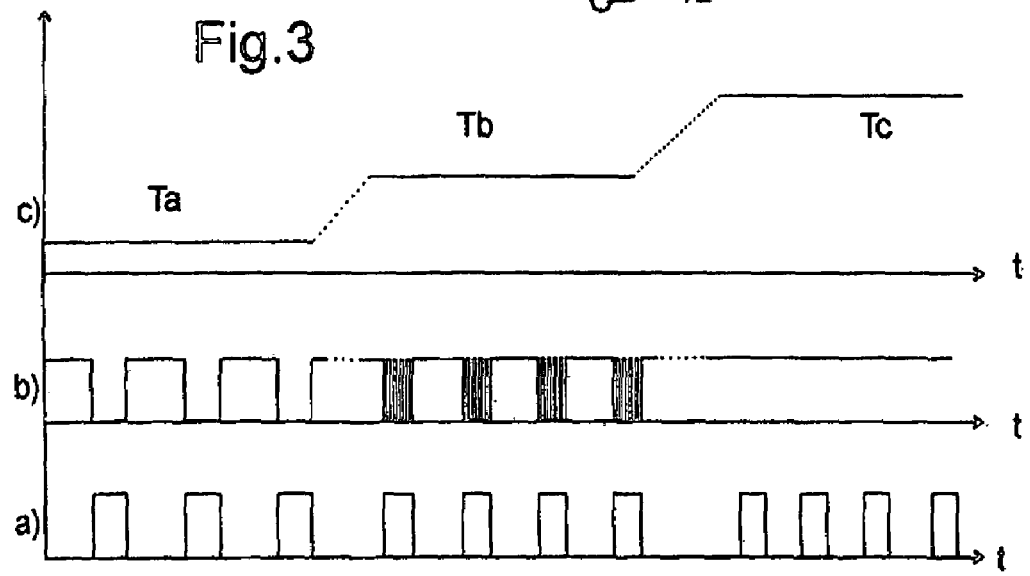

REFRIGERATION DEVICE AND OPERATING METHOD FOR A REFRIGERATION DEVICE

The present invention relates to a refrigeration device with two temperature zones cooled by evaporators arranged in a common coolant circuit and a method for operating such a refrigeration device.

In refrigeration devices moisture enters the interior of the refrigeration device by way of air exchange via door openings. This moisture condenses on surfaces, on which the dew point falls below. In higher-quality equipped refrigeration devices glass plates are being used increasingly as aprons, on which condensing moisture becomes particularly visible. Likewise, moisture condenses also on cold wares, which can be damaged directly thereby, e.g. when wrapped in paper. These problems appear especially in regions or in meteorological conditions at high humidity in moderate temperatures, as well as in high ambient temperatures, thus generally in subtropical/Mediterranean to tropical climes.

To prevent or restrict this type of condensation ventilators are being incorporated into cool rooms of refrigeration devices more and more. The rapid airflows generated by the latter reduce condensation.

The reinforced airflows generated by such a ventilator also result in an increased heat transmission rate on surfaces. In this way heat and moisture are exchanged more quickly inside the coolroom, resulting in a more even distribution of temperature and humidity in the coolroom.

The increased airflow speed also strengthens the heat exchange between the coolroom and the evaporator provided to cool it. This means that the evaporation temperature of the coolant circulating in the evaporator rises, and the refrigerating capacity of the evaporator is greater than in a refrigeration device without ventilator with unchanged evaporator geometry.

This leads to problems whenever a ventilator is supposed to be used to prevent condensation in a refrigeration device with two temperature zones, in which the two temperature zone are cooled by a evaporator arranged in a common coolant circuit. Since the same coolant stream flows through both evaporators in succession, they can both, depending on whether the coolant circuit is operational or not, in each case cool or not cool at the same time. Only a thermostat in one of the zones in general regulates refrigeration devices with a coolant circuit and two different temperature zones. This is usually in the zone with the higher temperature. The temperature in the second, colder zone then depends on the thermostat setting or the operating time of the coolant circuit, required to maintain the desired temperature in the first zone. With appropriate dimensioning of the heat exchanger the temperature in the second zone can be "set" within certain bounds, but depends in each case on the operating time of the coolant circuit, required to maintain the set temperature in the first temperature zone. This means that the temperature in the second zone is influenced by the same values as those in the first zone and is dependent on the selected thermostat setting. The ambient temperature is one of the influential factors, apart from frequency of operation and loading. At low ambient temperatures the operating time of the coolant circuit is no longer adequate to supply the deeper tempered zone with cold.

With a ventilator now provided in the zone with the higher temperature, consideration can be given to sizing of the evaporator, in which the dimensions of the evaporator of the warmer zone are reduced according to the improvement in heat exchange efficiency through airflow. It does not yet, however, provide a solution to the abovementioned problem. Rather, excessive reduction of the evaporator leads to the additional problem, where cool goods, blocking the flow path of air without ventilator and, evaporator can impair the effective refrigeration capacity. When this occurs the operating times of the evaporator are extended, required for maintaining the set temperature in the warmer zone, the cooler zone is sub-cooled, and energy consumption rises.

To maintain the temperatures in both temperature zones in each case in a set range at lower ambient temperatures, a solution is disclosed in EP-0-959 311 for providing a heating element in the higher temperate zone, which in the event that a temperature detected in the deeper temperature zone exceeds a preset limit value, to artificially cause additional heat input in the higher temperature zone, which then results in the coolant circuit being set in motion, in order to cool both zones together in a desired temperature range. This method is however not completely satisfactory, as it leads to an increased power consumption of the refrigeration device.

The object of the present invention is to provide an operating method for a refrigeration device and a refrigeration device, which enable operation of a ventilator in a temperature zone of the refrigeration device, without the dimensions of the evaporator in this zone having to be excessively reduced. Through intermittent operation of the fan, whereby non-operational phases of the fan coincide at least partly with operational phases of the coolant circuit, at least during such coincidence the efficiency of heat exchange is the same on the evaporator as in a refrigeration device without a fan, though in the remaining period, which will in general make up the predominant proportion of the operating time of the refrigeration device, the fan is effective enough to prevent condensation.

According to a particularly simple configuration of the invention the fan runs only in non-operational phases of the coolant circuit. Compared to a conventional thermostat-controlled refrigeration device with two temperature zones cooled by a coolant circuit this solution requires practically no additional control expenditure.

As a consequence of a further developed configuration there is also the possibility that fan and coolant circuit run at the same time, though the portion of operating time of the refrigeration device, in which this is the case, is fixed depending on the ambient temperature of the refrigeration device. This portion is preferably the greater, the higher the ambient temperature. In this way to a certain extent the temperatures in both temperature zones are neutralised; in the event of high ambient temperatures, where the heat input from outside is high in both temperature zones and the operating times of the coolant circuit required for maintaining a set temperature in the warmer temperature zone are so long that the danger of sub-cooling the colder zone occurs, the efficiency of the evaporator is improved through simultaneous operating of coolant circuit and fan, such that the required operating times of the coolant circuit are shorter than without the fan operating. At low ambient temperatures by contrast the coolant circuit and the fan run with little or no intersecting, resulting in lengthy operating times of the coolant circuit, which also suffice for adequate cooling of the lower temperature zone.

Another, alternative or complementary option is to detect the temperatures in both temperature zones of the refrigeration device, whereby one of the thus detected temperatures is employed to fix the operational phases of the coolant circuit and the other temperature is employed to fix the portion of the operating time of the refrigeration device, in which the fan and coolant circuit run at the same time.

Further features and advantages of the invention will emerge from the following description of embodiments with reference to the attached figures, in which:

FIG. 2 is a similar block diagram of a refrigeration device, which shows further developed configurations of the invention;

FIG. 3 is a time diagram, showing the operating times of the coolant circuit and the fan of a refrigeration device according to FIG. 2.

Figure 1:
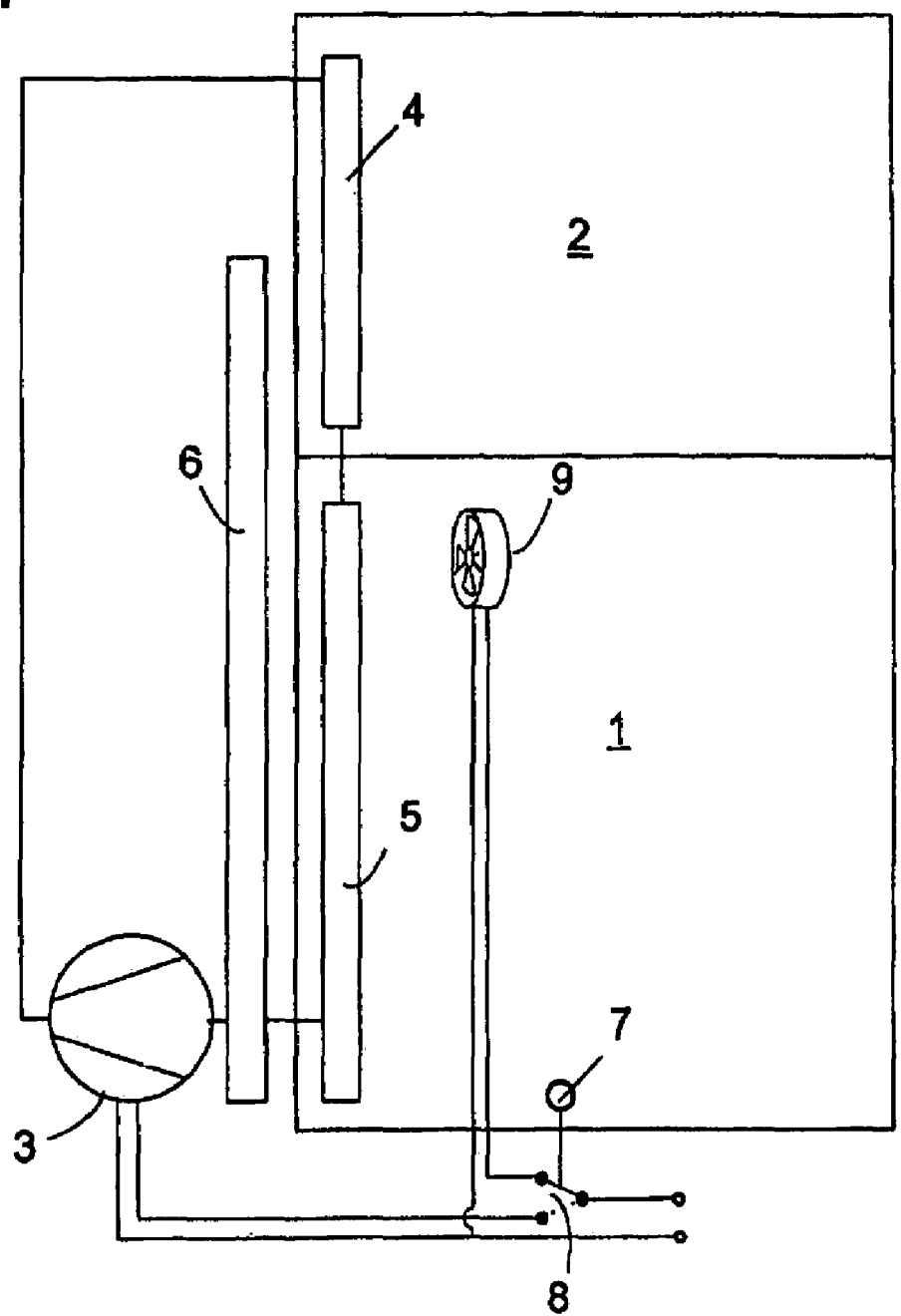
FIG. 1 is a block diagram of a refrigeration device according to a first, simple configuration of the invention.

FIG. 1 is a schematic illustration of a combination refrigeration device, on which the present invention is realised. A freezer section 1 and a freezer section 2 form two temperature zones of the refrigeration device. A coolant circuit comprises a compressor 3, which pumps a compressed coolant through two evaporators 4, 5 of the freezer section 2 or of the freezer section 1, as well as a heat exchanger 6, through which the coolant released in the evaporator s 4, 5 flows, before it re-enters the compressor 3. Operation of the compressor 3 is controlled by a switch 8, whereof a temperature sensor 7 arranged in the freezer section 1 controls the switch setting. The switch 8 has two switch settings, whereby in one of both settings the compressor 3 is supplied with current and in the other a fan 9 arranged in the freezer section 1. The switch 8 ensures that compressor 3 and fan 9 are never running at the same time, but in precise push-pull mode. While the coolant circuit is running slow air flows caused by convection occur in the freezer section, so that the efficacy of the evaporator 5 is the same as when the fan 9 were not present. The evaporator 5 can therefore have a large surface, and there is no danger that the evaporator 5 is substantially blocked and rendered ineffective by careless distribution of cool goods in the freezer section 1. On the other hand the fan 9 always runs whenever the compressor 3 is switched off, so that unwanted condensation of deposit surfaces and cool goods in the freezer section 1 is effectively prevented.

In the configuration of an inventive refrigeration device illustrated in FIG. 2 the switch 8 is replaced by a control unit 10. This control unit 10, together with a temperature sensor 7 arranged in the freezer section 1, takes on the function of the thermostat 7 and of the switch 8 of the configuration from FIG. 1. In addition, the control unit 10 is still connected to an external temperature sensor 12 and/or a freezer section temperature sensor 13. Since both temperature sensors 12, 13 do not have to be reset at the same time, the connections between these sensors and the control unit 10 are shown in dashed lines in the figure.

Reference is first made to the variant containing the freezer section temperature sensor 7 and the external temperature sensor 12.

FIG. 3 shows, for this configuration, operational and non-operational phases of the coolant circuit (line a) and of the fan (line b) for three different external temperature values Ta, Tb, Tc, detected by the sensor 12 and shown in line c.

In the case of a low external temperature Ta the heat input from the outside to the cooler and freezer section is minimal, and the intervals without successive operational phases of the compressor 3 are relatively large. To guarantee adequate cooling of the freezer section in this situation, the required compressor operational time is not to be further curtailed by running the fan 9. Fan and compressor therefore run in precise push-pull mode.

In the case of a higher external temperature Tb the interval between successive operational phases of the compressor shortens, and the portion of the compressor operational phases on the overall operating time of the refrigeration device increases. However, the cooling requirement of the freezer section 2 does not increase to the same extent as that of the freezer section, so that in the case of excessive operating time of the compressor there is the danger of sub-cooling of the freezer section 2. This danger is not avoided by the fan being switched on and off with a pulse-width repetition rate d during the operational phase of the compressor 3, whereby the exact numerical value of the pulse-width repetition rate d depends on the value of the measured external temperature. Due to the two-part fan operation in the operational phases of the compressor 3 the latter are shortened, such that the cold input to the freezer section 2 takes on a suitable value.

In the event of a higher external temperature Tc this pulse-width repetition rate d can finally reach the value 1, i.e. the fan 9 runs continuously, independently of whether the evaporator 3 runs or not.

Suitable values for d as a function of the external temperature can be determined experimentally and can be stored e.g. in the form of a table in the control unit 10.

Figure 4:
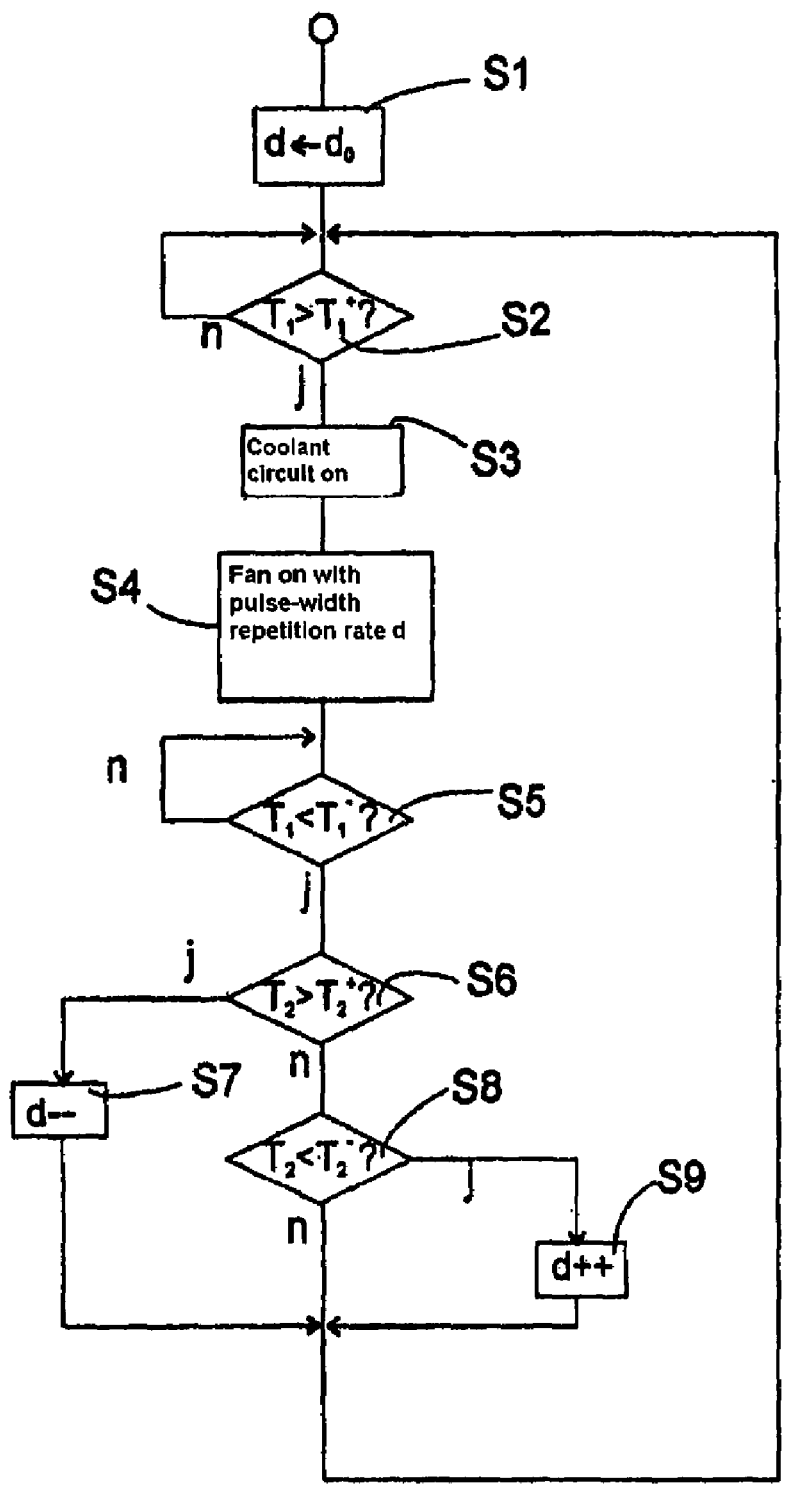
FIG. 4 is a flow diagram of a control method executed by the control unit of the refrigeration device of FIG. 2.

An alternative operating method, which can be carried out in a refrigeration device with freezer section temperature sensor 13, is described with reference to the flow diagram of FIG. 4. First, a start value do for the pulse-width repetition rate $d_0$ is fixed in step S1.

This value can be selected randomly, since it converges towards a favourable value during operation of the refrigeration device.

When inspection S2 of the freezer section temperature $T_1$, indicates that the former exceeds an upper edge $T_1^+$ of a permissible temperature range, the control unit 10 switches on the coolant circuit (S3); at the same time the fan 9 is actuated with the fixed pulse-width repetition rate d (S4) This is continued to the point where inspection S5 indicates that the temperature $T_1$, has reached or fallen below the lower limit $T_1^-$ of the permissible temperature range of the freezer section 1.

Next, a test is done to determine whether the temperature $T_2$ of the freezer section 2 is also within the permissible range. If its upper limit $T_2^+$ is exceeded (S6), then this shows that the freezer section 2 is not sufficiently supplied with cold, and that accordingly longer operating times of the coolant circuit would be desirable. As a consequence in step S7 the pulse-width repetition rate d is decremented, to accomplish just this. If the result in step S8 vice versa is that the temperature $T_2$ falls below the lower limit $T_2^-$ of the permissible range, then in step S9 the pulse-width repetition rate d is incremented. When the temperature $T_2$ is within the range $[T_2^-, T_2^+]$, the pulse-width repetition rate d is correct and remains unchanged.

Then the control returns to step S2. In this way, during several operational phases of the coolant circuit the pulse-width repetition rate d converts towards a value, which ensures measured cooling of the freezer section, and if the ambient temperature of the cooling requirement of the freezer section changes e.g. as a consequence of a change, then the pulse-width repetition rate d is automatically compared to this changed requisite.

The pitch of incrementing or decrementing in step S9 or S7 can be made proportional to the difference between $T_2$ and a temperature in the range $[T_2^-, T_2^+]$ e.g. $(T_2^-+T_2^+)/2$, in order to reach rapid convergence of d with strong standard deviations and fine regulating, which does lead to oscillations of d, with small standard deviations.

Of course it is also possible to fit out the refrigeration device both with the external temperature sensor. 12 and also with the freezer section sensor 13. This allows in each case the pulse-width repetition rate d adapted to the method shown in FIG. 4 to be carried out for individual values of the external temperature, and the values of the pulse-width repetition rate for different external temperatures to be stored in the control unit 10. Thus, with a change to the external temperature in each case, as soon as this is detected, will adjust the control unit 10 pulse-width repetition rate d pertinent to this external temperature, and in this way will achieve faster regulating of the freezer section.

The invention claimed is:

1. A method for operating a refrigeration device, the device provided with two separate temperature zones each having a set temperature range, each cooled by a separate evaporator with both evaporators arranged in a common coolant circuit having operational and non-operational phases, a first one of the temperature zones including a fan, comprising:

sensing the temperature in at least a first one of the temperature zones;

sensing the ambient temperature of the refrigeration device;

intermittently operating the fan in operational and non-operational phases depending on a preset temperature sensed in said first temperature zone to maintain each of the separate temperature zones in their respective set temperature range controlling the operational and non-operational phases of the fan and the coolant circuit such that the operational phases of said coolant circuit coincide at least partially with the non-operational phases of said fan; and controlling the proportion of the operating time of the refrigeration device in which said fan and said coolant circuit are simultaneously operational depending upon said sensed ambient temperature of said refrigeration device.

2. The method according to claim 1, including controlling said operational and non-operational phases of said fan and said coolant circuit such that the operational phases of said fan coincide at least partially with the non-operational phases of said coolant circuit.

3. The method according to claim 1, including controlling said operational and non-operational phases of said fan and said coolant circuit such that the operational phases of said fan coincide with the non-operational phases of said coolant circuit.

4. The method according to claim 1, including increasing said proportion of said operating time of said refrigeration device in which said fan and said coolant circuit are simultaneously operational as said sensed ambient temperature of said refrigeration device increases.

5. The method according to claim 1, including sensing the temperature in the second one of the temperature zones and controlling the operational phases of said coolant circuit depending on the temperature sensed in one of the temperature zones and controlling said proportion of said operating time of said refrigeration device in which said fan and said coolant circuit are simultaneously operational depending on the temperature sensed in the second one of said temperature zones.

6. The method according to claim 5, including said second temperature zone has a lower set temperature range than the set temperature range of said first temperature zone and decreasing said proportion of said operating time of said refrigeration device in which said fan and said coolant circuit are simultaneously operational as said sensed temperature of said second one of said temperature zones increases.

7. A refrigeration device, comprising:

two separate temperature zones each having a set temperature range, each said zone cooled by a separate evaporator with both of said evaporators arranged in a common coolant circuit having operational and non-operational phases;

a first one of said temperature zones including a fan;

a temperature sensor for sensing the temperature in at least a first one of the temperature zones;

a temperature sensor for sensing the ambient temperature of the refrigeration device;

a control device for intermittently operating said fan in said operational and non-operational phases depending on a temperature sensed in said first temperature zone to maintain each of said separate temperature zones in their respective set temperature range said control device controlling said operational and non-operational phases of said fan and said coolant circuit such that the operational phases of said coolant circuit coincide at least partially with the non-operational phases of said fan; and said control device controlling the proportion of the operating time of said refrigeration device in which said fan and said coolant circuit are simultaneously operational depending upon said sensed ambient temperature of said refrigeration device.

8. The refrigeration device according to claim 7, including said temperature sensor for sensing the ambient temperature of said refrigeration device is coupled to said control device.

9. The refrigeration device according to claim 7, including a second temperature sensor for sensing the temperature in the second one of said temperature zones and both of said temperature sensors coupled to said control device.

* * * * *